(12) United States Patent
Thomas et al.

(10) Patent No.: US 6,515,449 B1
(45) Date of Patent: Feb. 4, 2003

(54) BATTERY WITH LEAD/NUGGET PROTECTION INSERT

(75) Inventors: Shawn E. Thomas, Eastlake, OH (US); Ronald V. O'Connell, Harpersfield, OH (US)

(73) Assignees: NGK Spark Plug Co., Ltd (JP); NTK Powerdex, Inc., Wixom, MI (US)

( * ) Notice: Subject to any disclaimer, the term of this patent is extended or adjusted under 35 U.S.C. 154(b) by 0 days.

(21) Appl. No.: 09/990,223

(22) Filed: Nov. 21, 2001

(51) Int. Cl.$^7$ .............................. H02J 7/00; H01M 2/14
(52) U.S. Cl. ....................................... 320/107; 429/129
(58) Field of Search .................................. 320/107, 104; 429/94, 129, 131, 136, 137, 139; 29/623.1

(56) References Cited

U.S. PATENT DOCUMENTS 6,159,253 A * 12/2000 Lund .......................... 429/136

6,391,492 B1 * 5/2002 Kawakami et al. ........ 29/623.1

* cited by examiner

Primary Examiner—Edward H. Tso
Assistant Examiner—Pia Tibbits
(74) Attorney, Agent, or Firm—Mark Kusner; Michael A. Jaffe

(57) ABSTRACT

A Li-ion or Li-ion polymer battery, comprised of a battery assembly having a plurality of generally planar cathode sections, each having a flat, metallic cathode current collector tab extending therefrom. A cathode tab weldment joins the cathode current collector tabs together with a cathode battery lead, and an anode tab weldment joins the anode current collector tabs together with an anode battery lead. A battery package contains the battery assembly with the anode tab weldment and the cathode tab weldment within the package and the anode and cathode battery leads extend through the package. A protective insert within the battery package surrounds the anode and cathode tab weldments and isolates the weldments from the battery package. The insert surrounds the battery leads where the battery leads extend through the package.

27 Claims, 9 Drawing Sheets

BATTERY WITH LEAD/NUGGET PROTECTION INSERT

FIELD OF THE INVENTION

The present invention relates to lithium-ion and/or lithium-ion polymer batteries, and more particularly to a lithium-ion or lithium-ion polymer battery having a protective insert to provide structural support and protection around battery leads and connections.

BACKGROUND OF THE INVENTION

Broadly stated, a Li-ion and/or Li-ion polymer battery is generally comprised of a plurality of layered sections, namely, an anode section, a cathode section and a separator that is disposed between the anode section and the cathode section. Multi-layered cells are comprised of a plurality of anode and cathode sections.

Each anode section and each cathode section includes a layer of a conductive material that is disposed within or in contact with such sections. This layer is generally referred to as a "current collector." It is known to use metal screens, meshes or foils to form the aforementioned current collectors. Typically, copper mesh is used to form an anode current collector and an aluminum metal mesh is used to form a cathode current collector. Multi-layered cells typically include a plurality of anode current collectors and a plurality of cathode current collectors. Each current collector generally includes a short, outwardly extending tab that is ultimately connected to a battery lead. The battery leads are typically comprised of a flat, metallic strip, formed of copper, aluminum or nickel. It is therefore necessary to join all anode current collector tabs together and attach them to an anode battery lead. Likewise, all cathode current collector tabs must be joined together and attached to a cathode battery lead.

Typically, the cathode current collector tabs are joined together, and joined to a cathode battery lead, by ultrasonic welding. The welding procedure produces a "weldment" or "weld nugget" with the cathode battery lead extending therefrom. The weld nugget is disposed within the battery's package with the cathode lead extending through the packaging to form an external cathode battery lead. In a similar manner, anode current collector tabs are attached to an anode lead that extends through the battery package to form an external anode battery lead.

Within the battery package, the weldments are disposed in an area conventionally referred to as "head space." This area is essentially a void space within the battery provided to accommodate the weldments (nuggets). This void space within the battery package can cause the laminate forming the battery packaging to collapse or crumple in these areas during a battery de-gassing processes, wherein excess gas is removed from the battery package by drawing a vacuum therein. The negative, internal pressure within the battery package typically causes the packaging laminate to collapse wherever internal voids exist, thereby forming indentations or depressions in the outer surface of the packaging. Whenever the packaging laminate contacts the battery electrodes, current collector leads, or weldments, the possibility of shorting the battery exists if the interior insulation layer of the laminate fails. (The packaging laminate generally includes metal foil layers for structural integrity and hermeticity). Contact between the metal foil of the packaging and a conductive layer of the battery, shorts the battery thereby rendering it useless.

The present invention overcomes these and other problems and provides a battery wherein void spaces around the weldments and collector tabs within the battery package are reduced and the weldments are separated from the packaging laminate to reduce the likelihood of shorting as a result of the packaging laminate being drawn into electrical contact with a collector tab, weldment or lead.

SUMMARY OF THE INVENTION

In accordance with a preferred embodiment of the present invention, there is provided a Li-ion or Li-ion polymer battery, comprised of a battery assembly having a plurality of generally planar cathode sections, each having a flat, metallic cathode current collector tab extending therefrom, and one or more generally planar anode sections each having a flat, metallic anode current collector tab extending therefrom. The cathode sections and one or more anode sections are stacked together, wherein the cathode current collector tabs are aligned and the anode current collector tabs are aligned. A cathode tab weldment joins the cathode current collector tabs together and joins the tabs to a cathode battery lead. An anode tab weldment joins the anode current collector tabs together and joins the tabs to an anode battery lead. A battery package contains the battery assembly. The battery package has an interior space for receiving the anode tab weldment and the cathode tab weldment. The anode and cathode battery leads extend through the packaging to form external battery leads. A protective insert is disposed within the battery package. The insert surrounds the anode and cathode tab weldments and isolates the weldments from the battery package. The insert surrounds the battery leads where the battery leads extend through the package.

In accordance with another aspect of the present invention, there is provided a Li-ion or Li-ion polymer battery, comprised of a battery assembly having a plurality of generally planar cathode sections, each having a flat, metallic cathode current collector tab extending therefrom, and one or more generally planar anode sections each having a flat, metallic anode current collector tab extending therefrom. The cathode sections and one or more anode sections are stacked together. A cathode tab weldment joins the cathode current collector tabs together and to a cathode battery lead, an anode tab weldment joins the anode current collector tabs together and to an anode battery lead. A battery package having an interior space receives the battery assembly, the anode tab weldment and the cathode tab weldment with the anode and cathode battery leads extending through the packaging to form external battery leads. A molded insert disposed within the battery package surrounds the anode and cathode tab weldments and isolates the weldments from the battery package.

It is an object of the present invention to provide a Li-ion or Li-ion polymer battery that is less susceptible to failure from shorting during fabrication.

Another object of the present invention is to provide a Li-ion or Li-ion polymer battery as described above having a protective barrier around tab weldments within the battery.

A still further object of the present invention is to provide a Li-ion or Li-ion polymer battery having protective layers around the battery leads in the vicinity where the battery leads extend through the battery packaging.

A still further object of the present invention is to provide a Li-ion or Li-ion polymer battery as described above, wherein the protective barrier and the protective layers are part of an integrally formed insert.

These and other objects will become apparent from the following description of preferred embodiments of the invention, taken together with the accompanying drawings.

BRIEF DESCRIPTION OF THE DRAWING

The invention may take physical form in certain parts and arrangement of parts, preferred embodiments of which shall be described in detail in the specification and illustrated in the accompanying drawings which form a part hereof, and wherein.

DETAILED DESCRIPTION OF PREFERRED EMBODIMENTS

Figure 1:
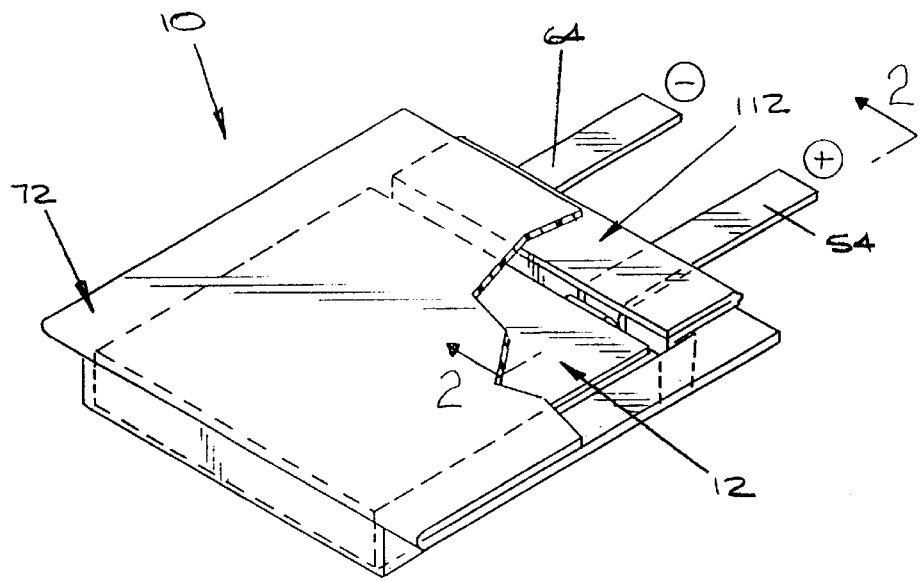
FIG. 1 is a partially sectioned, perspective view of a battery having a protective insert, illustrating a preferred embodiment of the present invention.
Figure 2:
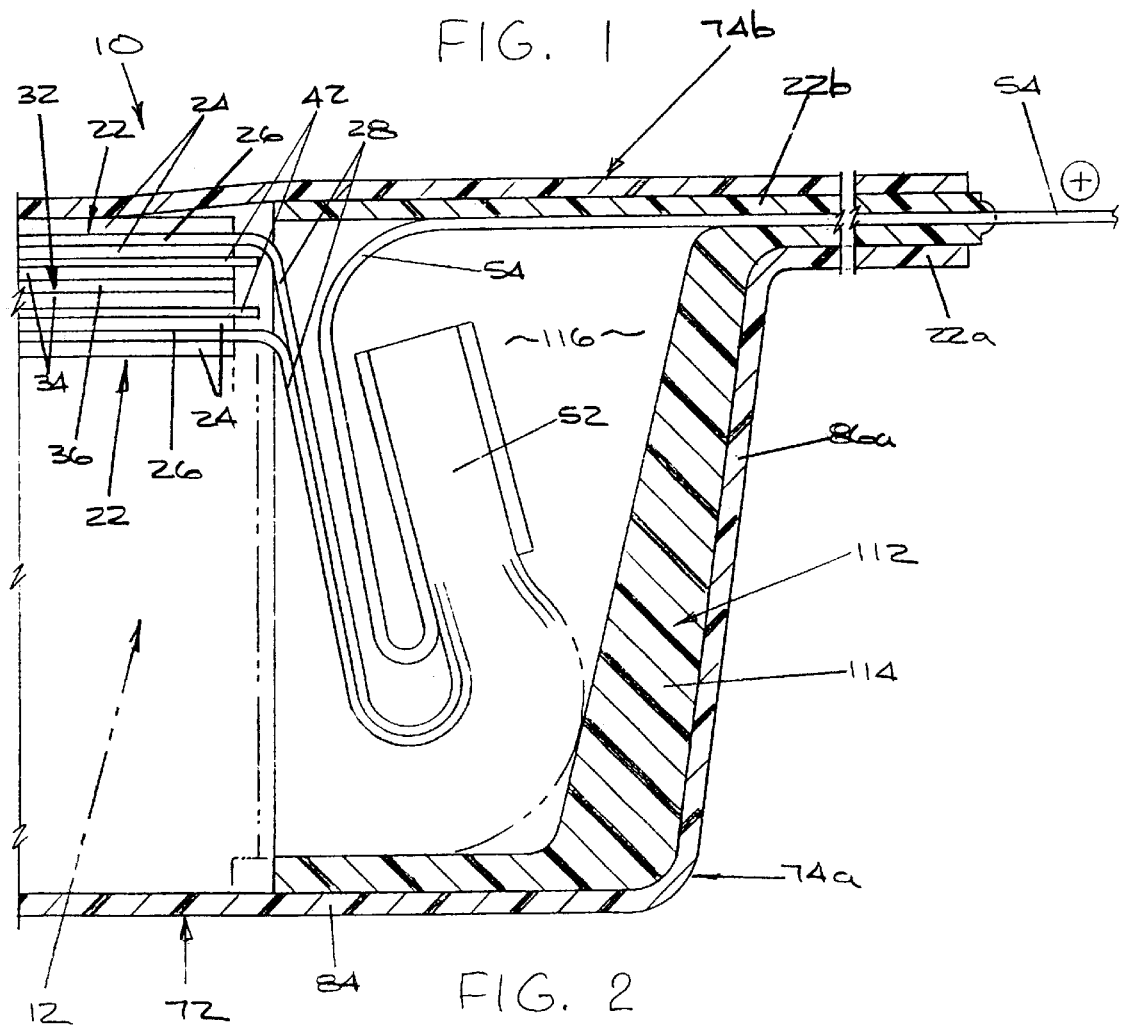
FIG. 2 is an enlarged, sectional view taken along lines 2—2 of FIG. 1.

Referring now to the drawings wherein the showings are for the purpose of illustrating the preferred embodiment of the invention only, and not for the purpose of limiting same, FIG. 1 shows a battery 10. Battery 10 is preferably a lithium-based electrochemical battery. Battery 10 may be a primary (nonrechargeable) battery or a secondary (rechargeable) battery. Battery 10 is comprised of battery assembly 12, package 72 containing such battery assembly 12, and a protective insert 112 disposed within package 72 at one end of battery assembly 12. In the embodiment shown, battery assembly 12 is comprised of a plurality of cathode sections 22 and a plurality of anode sections 32, best seen in FIG. 2. Anode section 32 is disposed between each cathode section 22, and a separator layer 42 is disposed between each anode section 32 and each cathode section 22.

Each cathode section 22 is comprised of two layers 24 of a cathode film. Cathode film layer 24 is preferably comprised of a lithiated metal oxide active material, a conductive material and a binder material. A cathode current collector 26 formed of a metal screen, metal mesh or a sheet of perforated metal is provided between cathode layers 24. Cathode current collector 26 is preferably formed of an aluminum metal mesh. Cathode current collector 26 preferably has a thickness of about 25 $\mu$m to about 50 $\mu$m. Each cathode current collector 26 includes an outward extending tab or strip 28. Each cathode layer 24 preferably has a thickness of about 50 $\mu$m to about 200 $\mu$m, and more preferably about 80 $\mu$m to about 150 $\mu$m.

Each anode section 32 is comprised of two layers 34 of an anode film having an anode current collector 36 disposed therebetween. Each anode current collector 36 is preferably formed of a metal mesh, metal screen or a sheet of perforated metal having a thickness of about 25 $\mu$m to about 50 $\mu$m. Anode current collector 36 is preferably formed of a copper mesh. The film-forming anode layers 34 are preferably comprised of a carbon active material, a conductive material and a binder material. Each anode current collector 36 includes an outwardly extending tab or strip 38. Each anode layer 34 preferably has a thickness of about 50 $\mu$m to about 200 $\mu$m, and more preferably about 80 $\mu$m to about 150 $\mu$m.

Figure 3:
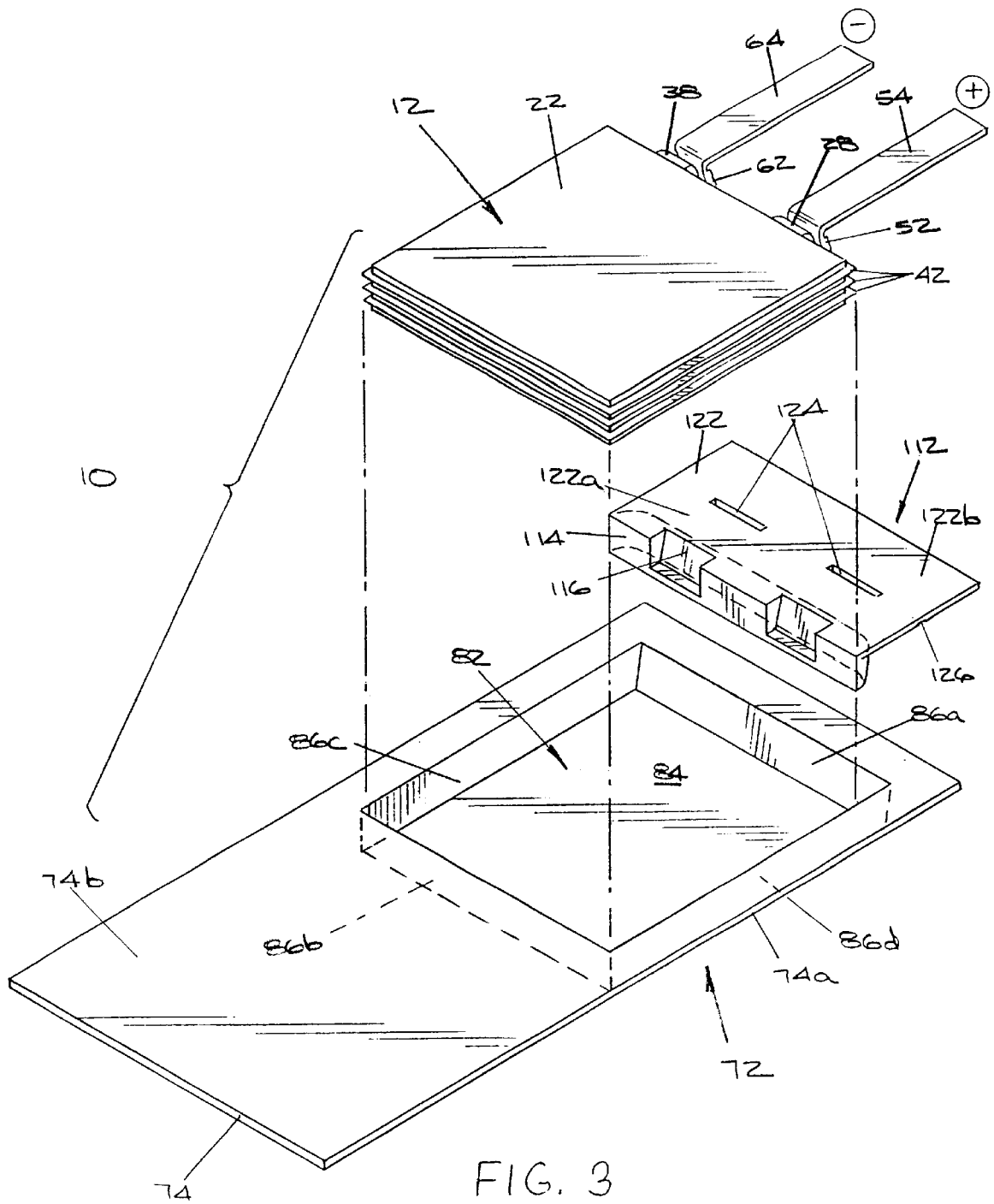
FIG. 3 is an exploded view of the battery shown in FIG. 1.

Each current collector tab 28 is joined together into a generally solid cathode tab weldment 52 that is attached to a cathode lead 54. Cathode lead 54 is adapted to project outside of package 72 to form a positive lead of battery 10. In similar respects, each anode current collector tab 38 is joined together into a generally solid anode tab weldment 62 that is attached to an anode lead 64, as best seen in FIG. 3. Anode lead 64 is adapted to project outside of package 72 to form the negative lead of battery 10.

Package 72 is adapted to contain battery assembly 12 in a hermetically sealed fashion and to have cathode and anode leads 54, 64 extending outwardly through package 72. In accordance with the present invention, package 72 is formed of a sheet 74 of a laminate material. Laminate sheet 74 is generally comprised of a metallic foil layer disposed between two polymeric adhesive layers. (The specific polymeric adhesive layers and metallic foil layer are not shown in the drawings). In a preferred embodiment, laminate sheet 74 is comprised of an inner, aluminum layer and outer layers of polypropylene (PP) or polyethylene (PE). The overall thickness of the laminate is typically between 0.10 mm and 0.15 mm.

Laminate sheet 74 is generally rectangular in shape and has a base portion 74a and a cover portion 74b. A generally rectangular cavity 82 is formed in base portion 74a of laminate sheet 74. Cavity 82 may be formed by conventional forming means, such as a stamping process or a molding process. Cavity 82 has a bottom wall 84 and four side walls, designated 86a, 86b, 86c and 86d, that define an opening dimensioned to receive battery assembly 12.

Figure 4:
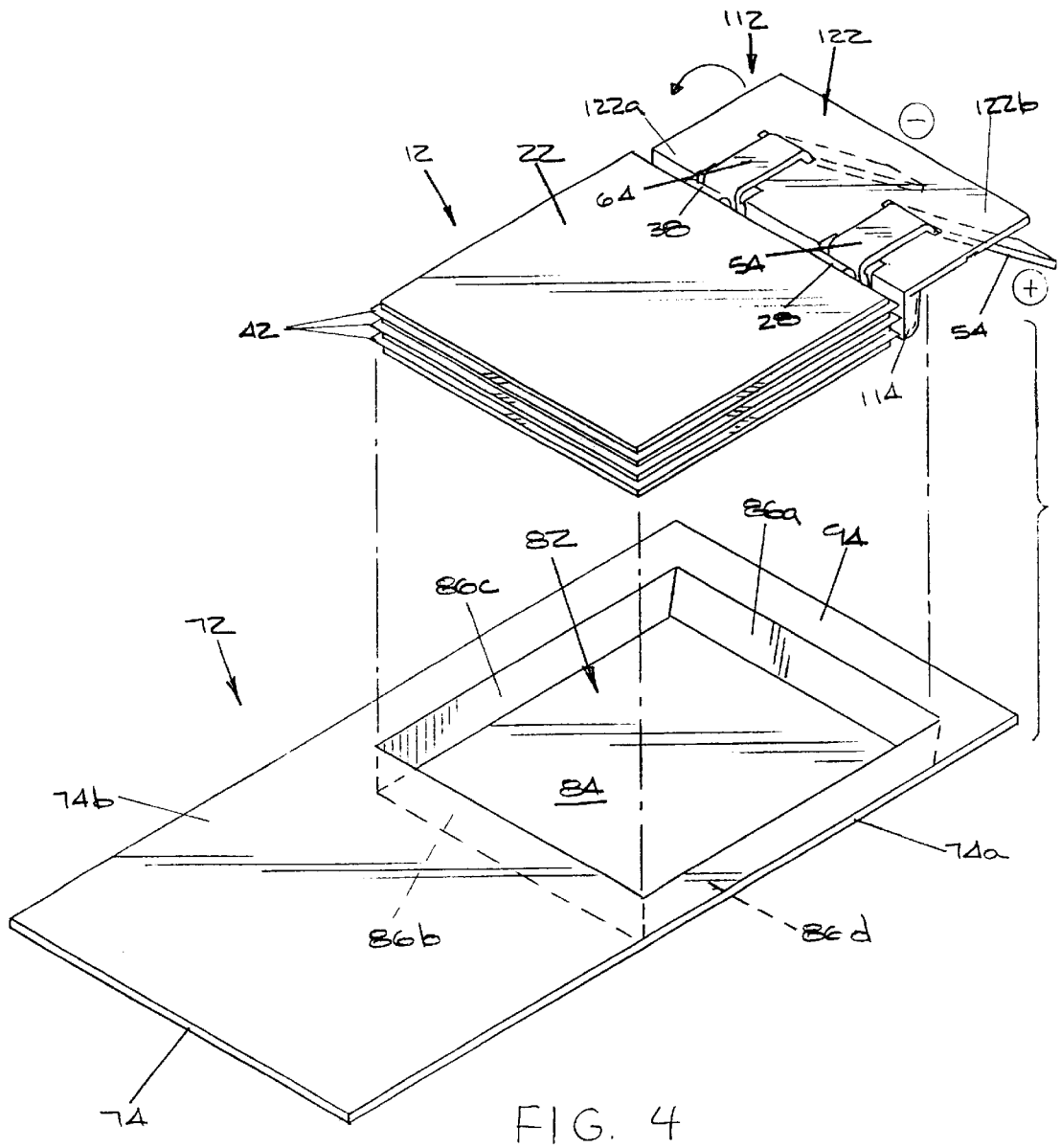
FIG. 4 is an exploded view of the battery assembly of FIG. 3 showing an initial step in joining the protective insert and the battery assembly.

Cavity 82 is disposed within base portion 74a of laminate sheet 74 such that a generally U-shaped flange 94 (as seen in FIG. 4) of sheet material is formed around cavity 82 and extends around three side walls 86a, 86c and 86d. In the embodiment shown, cavity 82 and U-shaped flange 94 comprise base portion 74a of laminate sheet 74, wherein cover portion 74b of laminate sheet 74 extends from side wall 86b. Cavity 82 is dimensioned to receive battery assembly 12 therein, with cathode and anode leads 54, 64 extending over flange 94 and with tab weldments 52, 62 that are disposed within cavity 82. Tab weldments 52, 62 are disposed within a space 84 conventionally referred to as "head space."

Cover portion 74b of laminate sheet 74 is dimensioned to be folded over onto base portion 74a of laminate sheet 74 so as to cover cavity 82 and overlay U-shaped flange 94 and cathode and anode leads 54, 64, as best seen in FIG. 1.

Figure 7:
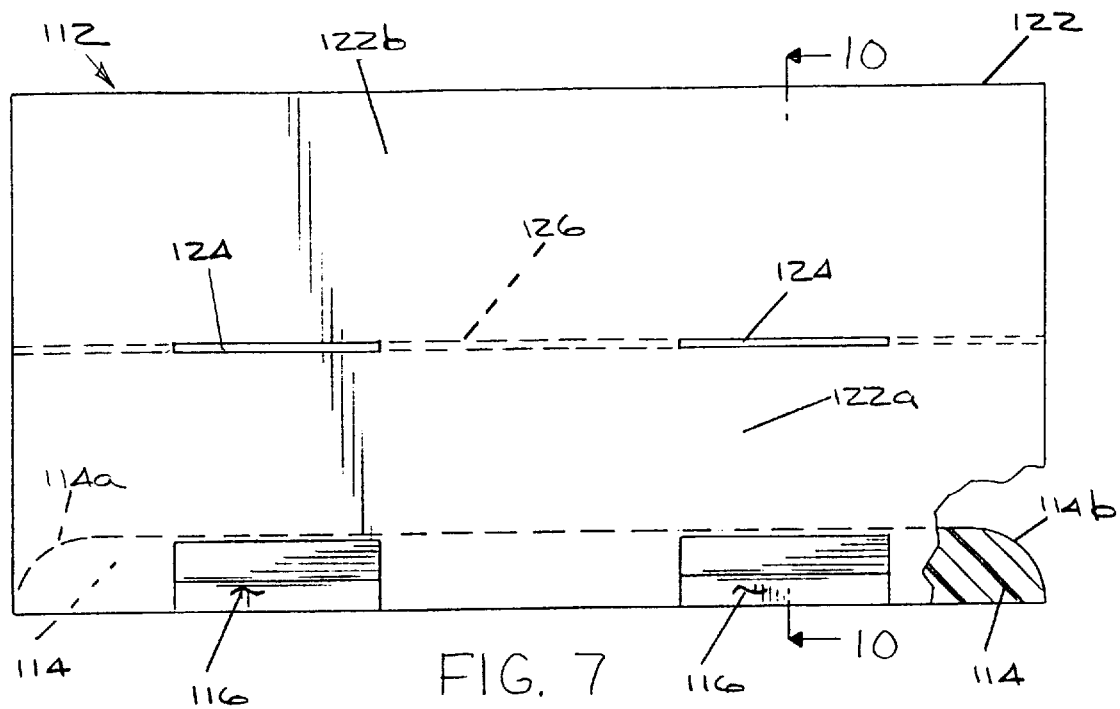
FIG. 7 is an enlarged, top plan view of the protective insert shown in FIGS. 1–6.
Figure 8:
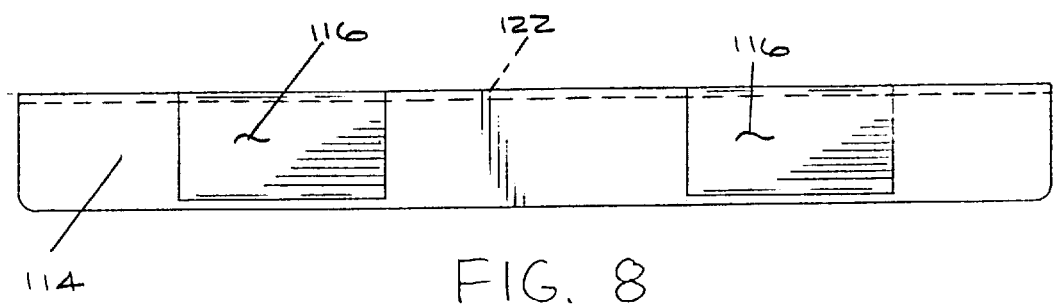
FIG. 8 is an end view of the protective insert shown in FIG. 7.

Protective insert 112, best seen in FIGS. 7–10 is a molded component having a body portion 114 and an outwardly extending flange portion 122. Body portion 114 is dimensioned to be disposed within cavity 82 of battery package 72, and more specifically, within the "head space" defined between the edge of battery assembly 12 and side wall 86a of battery package 74. Spaced-apart recesses 116 are formed in insert 112 to receive cathode tab weldment 52 and anode tab weldment 62. As best seen in FIG. 7, corners 114a, 114b of body portion 114 may be rounded to fit more easily within the corners of cavity 82.

Figure 9:
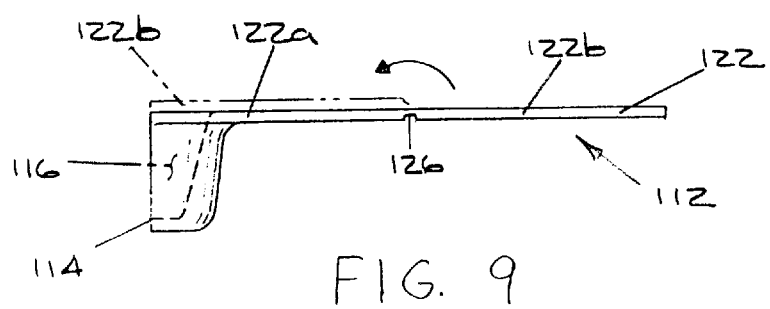
FIG. 9 is a side, elevational view of the protective insert shown in FIG. 7.
Figure 10:
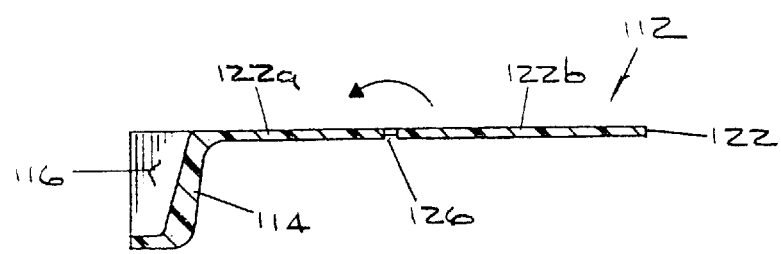
FIG. 10 is a sectional view taken along lines 10—10 of FIG. 7.

In the embodiment shown, flange portion 122 is generally flat and extends to one side of body portion 114. Two, spaced-apart slots 124 are formed through flange portion 122. Slots 124 are dimensioned to allow cathode lead 54 and anode lead 64 to extend therethrough, as shall be described in greater detail below. Slots 124 are aligned to be parallel to the side of body portion 114. A thin groove or channel 126 is formed in one surface of flange portion 122. Channel 126 is aligned with slots 124 and forms an area of reduced thickness to allow flange portion 122 to be bent or folded therealong. Groove 126 essentially divides flange portion 122 into a first flange section 122a and a second flange section 122b. As illustrated in FIG. 9, groove 126 is dimensioned to allow flange section 122b to be bent over onto flange section 122a. As will be appreciated from a further reading of the specification, flange sections 122a and 122b need not be molded in a coplanar orientation relative to each other. In this respect, flat flange section 122b may be molded at obtuse or arcuate angles relative to flat flange section 122a, to facilitate its use as shall be discussed in greater detail below.

In the embodiment shown in FIGS. 1–10, protective insert 112 is an integrally molded, unitary component, that is formed of a thermoplastic polymer that is chemically inert to solvents within battery 10. In a preferred embodiment, protective insert 112 is formed of a non-conductive, polymer that may be softened by heating to a temperature between 160° C. and 190° C. and is relatively water impermeable.

Figure 5:
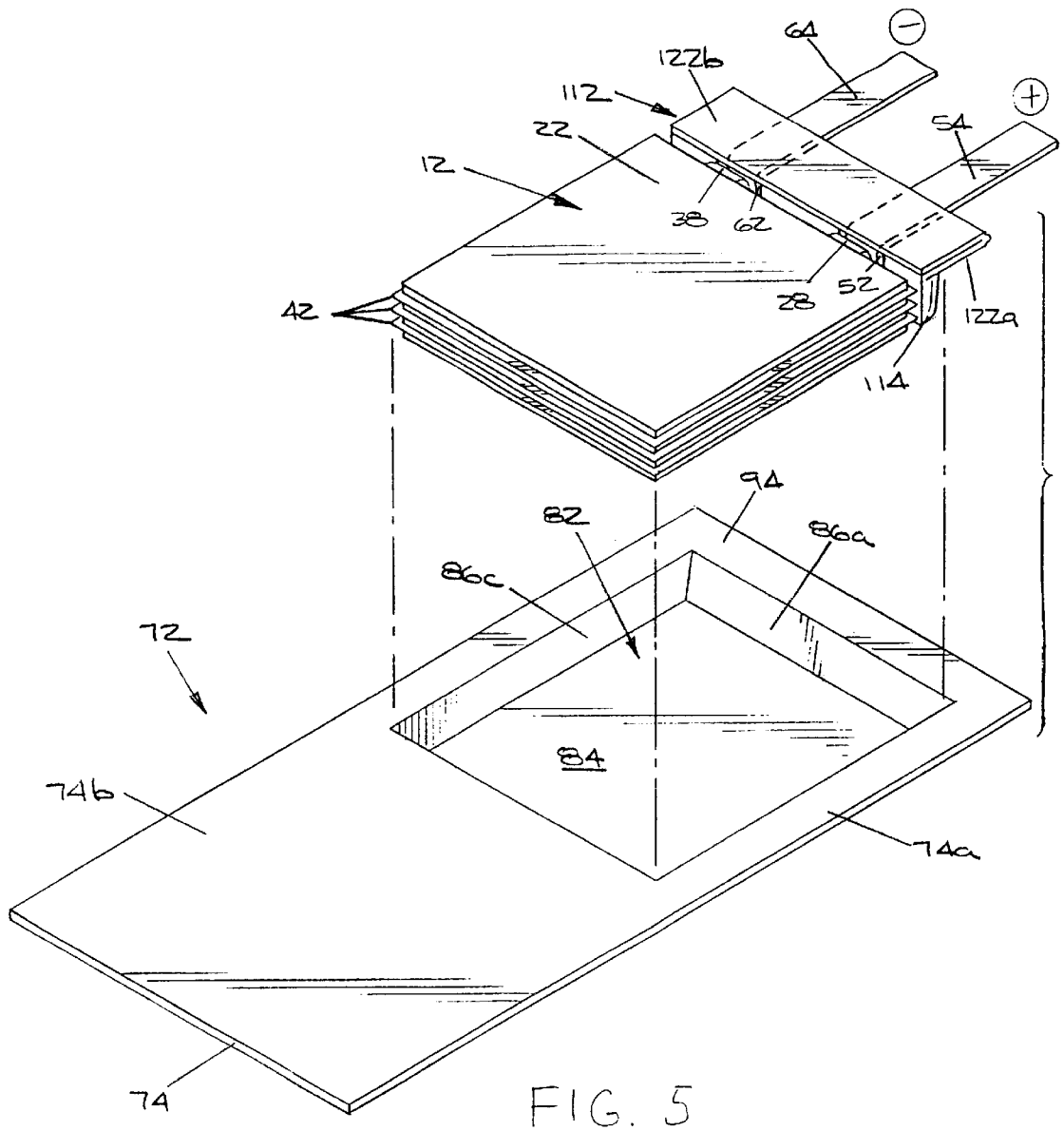
FIG. 5 is an exploded view of the battery assembly of FIG. 3 showing a second step in joining the protective insert to the battery assembly.
Figure 6:
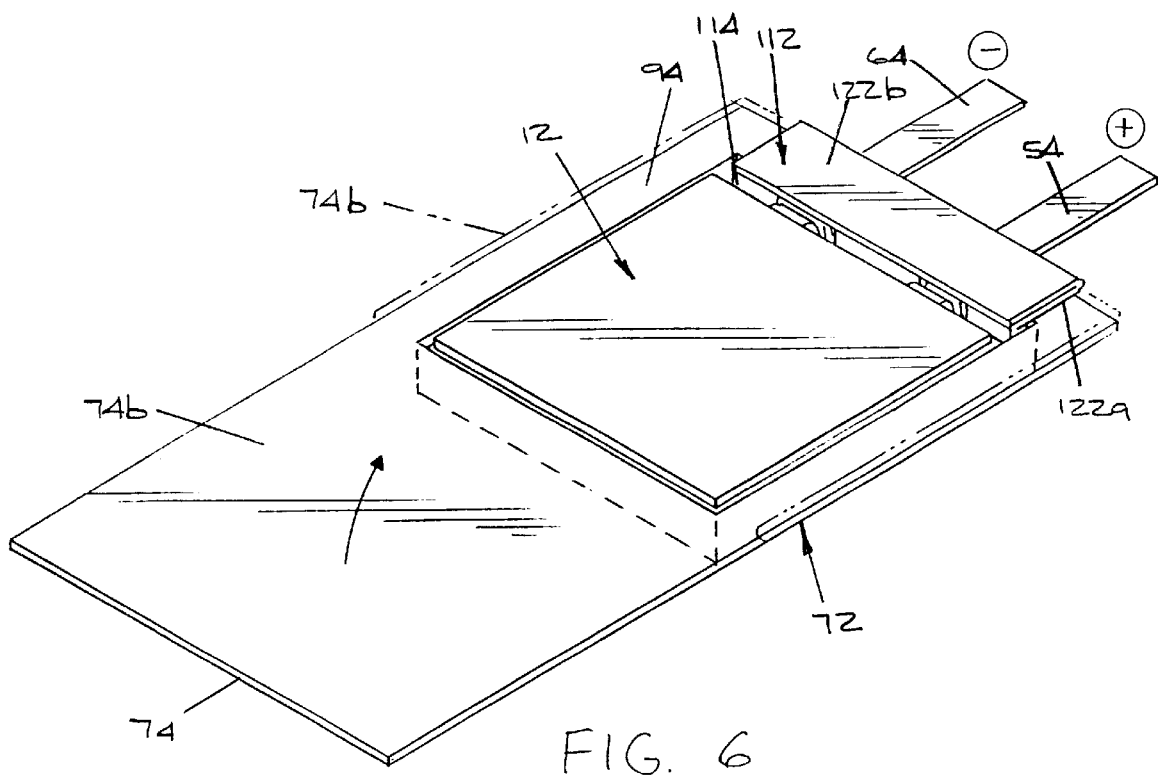
FIG. 6 shows the protective insert and battery assembly joined together and disposed within the battery packaging.

Protective insert 112 is adapted to be joined to battery assembly 12 and be inserted together with battery assembly 12 into battery package 72. As illustrated in FIGS. 4–6, cathode and anode battery leads 54, 64 are inserted through slots 124. Cathode tab weldment 52 and anode tab weldment 62 are received in recesses 116 of body portion 114 (best illustrated in FIG. 2). Flange section 122b is then folded along groove 126 onto flange section 122a, as best seen in FIG. 5. As indicated above, molding flange section 122b at an angle such as 80° to 100°, relative to flange section 122a, and forming slots 124 and groove 126 at the junction of flange sections 122a and 122b could allow easier insertion for battery leads 54, 64 through slots 124 without bending or flexing leads 54, 64. Battery assembly 12 and protective insert 112 are then inserted into battery package 72. Cover portions 74b of battery package 72 is then folded over base portion 74a of laminate sheet 74 to cover cavity 82 and overlay U-shaped flange 94. As illustrated in FIG. 1, cover portion 74b overlays flange section 122b of protective insert 112.

Pressure and sufficient heat are applied to laminate sheet 74 along U-shaped flange 94 and the areas of cover portion 74b mating therewith, so as to cause the outer polymer layer of laminate sheet 74 to soften and bond to the polymer layer of cover portion 74b that forms the U-shaped flange 94 of base portion 74a. Where battery leads 54, 64 extend through battery package 72, flange sections 122a, 122b are disposed between cover portion 74b and base portion 74a, and around leads 54, 64. The heat applied to laminate sheet 74 along U-shaped flange 94 is preferably sufficient to cause flange sections 122a, 122b to soften and flow around leads 54, 64 to form a seal therearound, and further to adhere to the polymer layers of cover portion 74b and U-shaped flange portion 94 of base portion 74a. In this respect, flange sections 122a, 122b soften and form a seal around battery leads 54, 64 (best illustrated in FIG. 2) and a seal with cover portion 74b and U-shaped flange portion 94 of base portion 74a. As a result, a U-shaped, hermetic seal is formed around battery assembly 12, thereby encasing battery assembly 12 within cavity 82, protective insert 112 forming a seal around the cathode and anode leads 54, 64.

The present invention thus provides a battery 10 with a protective insert 112 that forms a mechanical barrier to surround and protect tab weldments 52, 62. In this respect, tab weldments 52, 62 and battery leads 54, 64 are isolated from laminate 74. In addition, protective insert 112 essentially fills much of the empty space found in similar batteries known heretofore, thereby helping battery package 72 maintain its shape during a degassing process and subsequent use. Battery package 72 is thus more resistant to impact and deformation. Still further, flange sections 122a, 122b, by extending along the entire edge of battery package 72, provide a more uniform sealed edge, thereby assisting the formation of a mechanical barrier and seal between battery package 72 and battery leads 54, 64.

Figure 11:
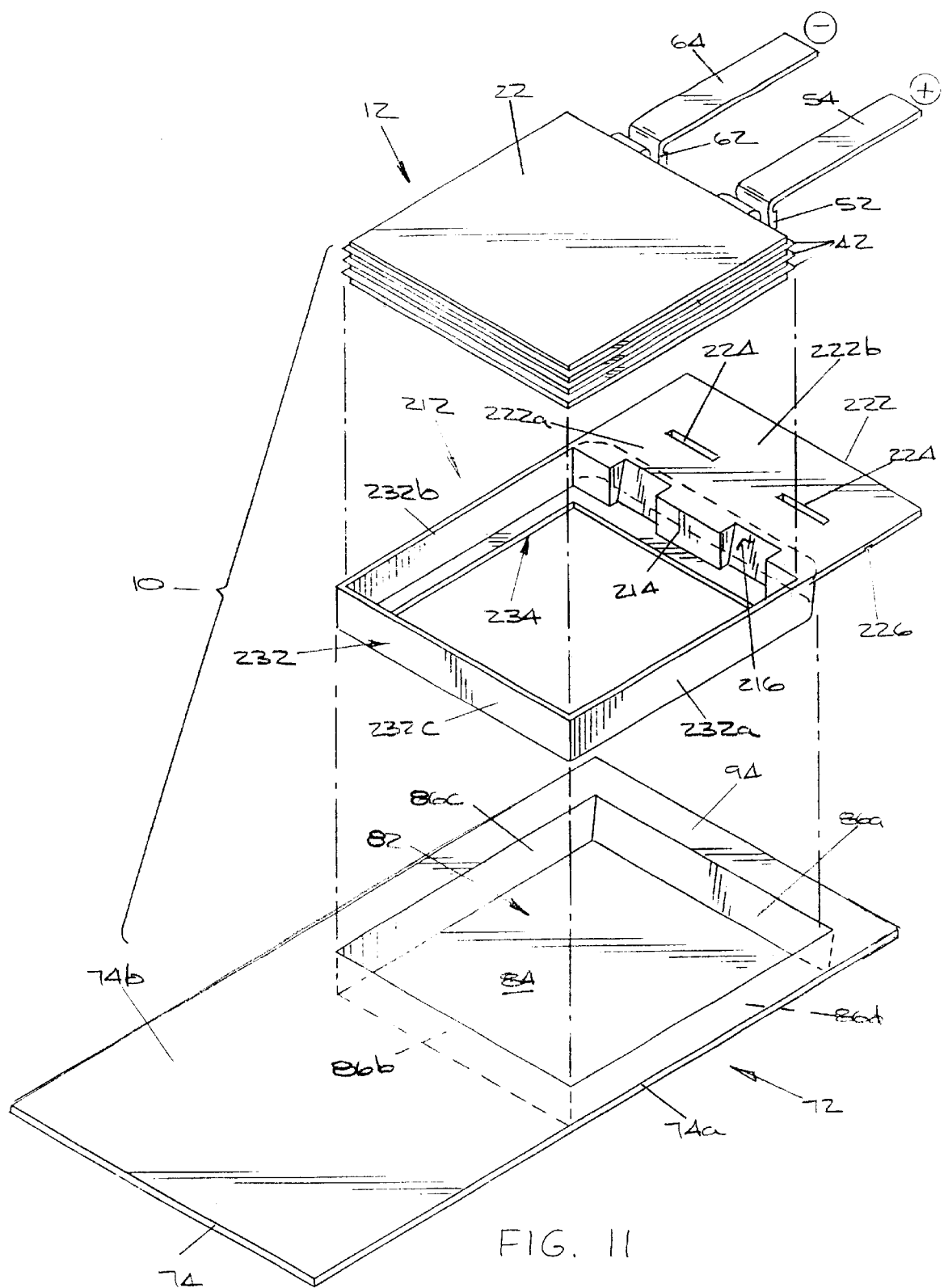
FIG. 11 is an exploded view of a battery assembly, showing a protective insert illustrating another embodiment of the present invention.
Figure 12:
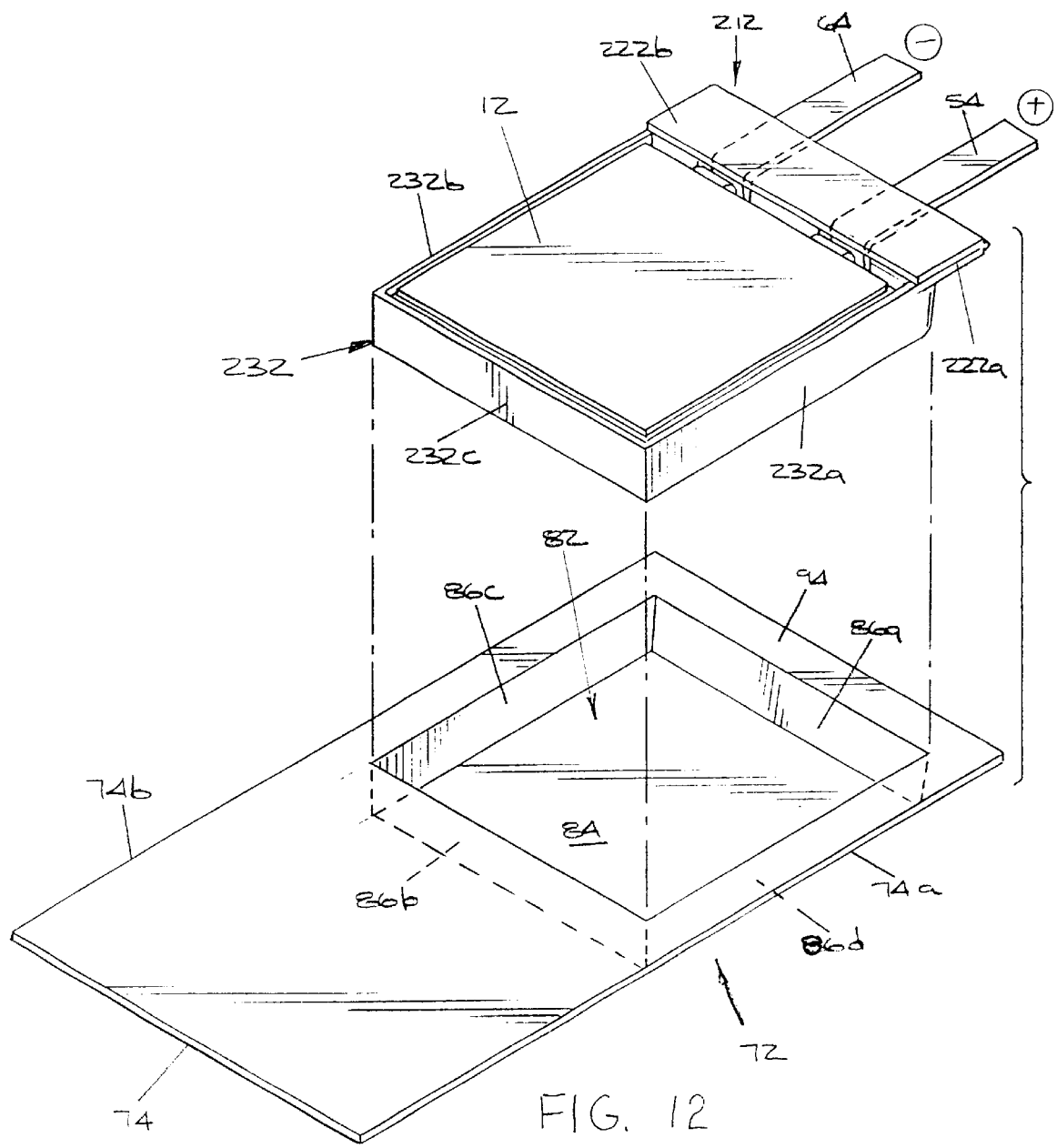
FIG. 12 is an exploded view of the battery shown in FIG. 11, showing the protective insert joined with a battery assembly.

Referring now to FIGS. 11 and 12, a protective insert 212 illustrating another embodiment of the present invention, is shown. Like protective insert 112, protective insert 212 is a molded component having a body portion 214 with recesses 216 and a flange portion 222 having spaced-apart slots 224 to receive cathode lead 54 and anode lead 64. A groove 226 divides flange portion 222 into flange section 222a and flange section 222b. In addition, protective insert 212 includes a peripheral band portion 232 comprised of opposing side portions 232a, 232b and an end portion 232c. Band portion 232 is generally L-shaped in cross-section and defines a lower ledge 234 to receive battery assembly 12.

As illustrated in FIG. 12, cathode lead 54 and anode lead 64 are inserted through slots 224. Cathode and anode tab weldments 52, 62 are disposed within recesses 216. Band portion 232 surrounds the periphery of battery assembly 12. Protective insert 212 with battery assembly 12 therein is then inserted into cavity 82 of battery package 72. Cover portion 74b of laminate sheet 74 is then folded over base portion 74a so as to cover cavity 82 and seal battery package 72, as heretofore described, to form battery 10. Band 232 provides additional protection to the peripheral edges of battery assembly 12, and further isolates the edges of cathode sections 222 and anode sections 232 from laminate 74.

Figure 13:
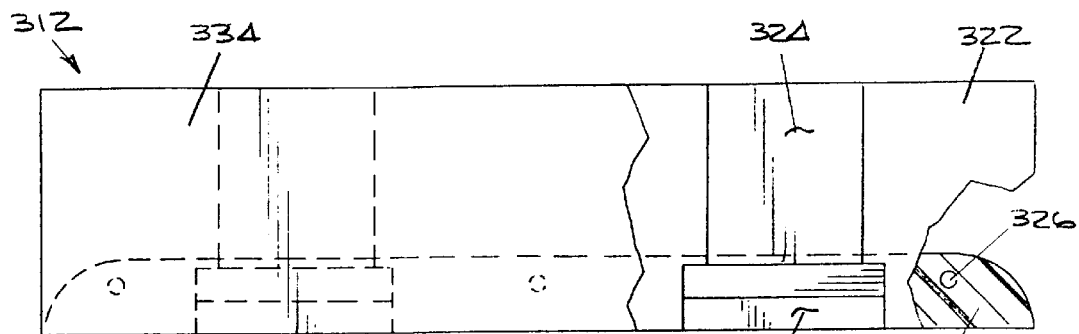
FIG. 13 is a top plan view of a protective insert, illustrating another embodiment of the present invention.
Figure 14:
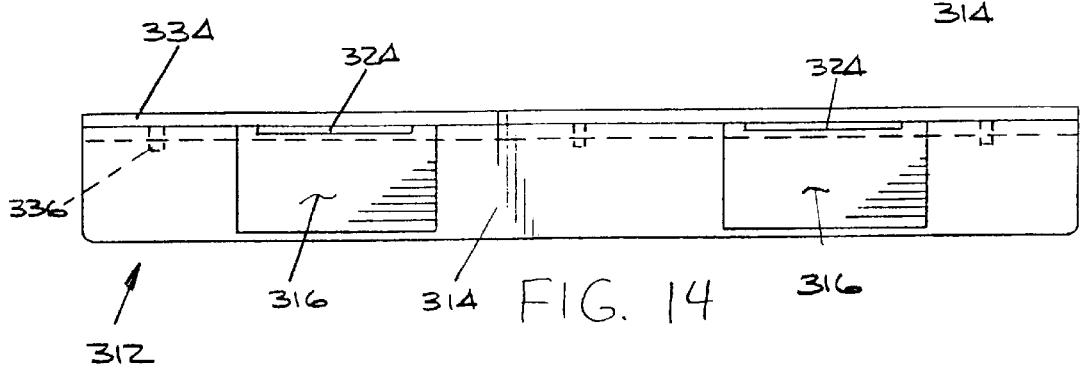
FIG. 14 is an end, elevational view of the protective insert shown in FIG. 13.
Figure 15:
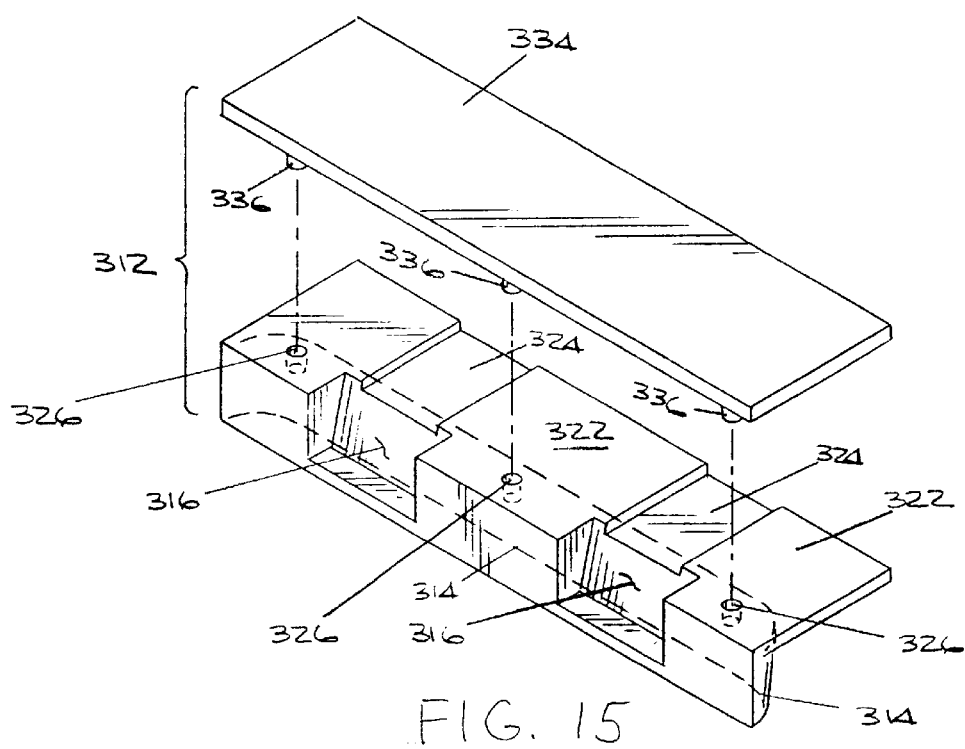
FIG. 15 is an exploded, perspective view of the insert shown in FIG. 13.

Referring now to FIGS. 13–15, a protective insert 312, illustrating yet another embodiment of the present invention is shown. Protective insert 312 is a two-piece component comprised of a body portion 314 and a cover portion 334. body portion 314 has a flange portion 322 extending therefrom. Body portion 314, like body portion 114 of protective insert 112, it is dimensioned to be disposed within cavity 82 of battery package 74 and more specifically, within the "head space" defined between the end of battery assembly 12 and wall portion 86a of package 72. Two, spaced-apart recesses 316 are formed in body portion 314 to receive cathode tab weldment 52 and anode tab weldment 62. Flange portion 322 is dimensioned to extend over flange portion 94 of package 72. Two, spaced-apart channels 324 are formed in the upper surface of flange portion 322. Channels 324 are dimensioned to receive cathode lead 54 and anode lead 64.

Cover portion 334 is basically a flat plate dimensioned to rest upon flange portion 322. Cover portion 334 includes spaced-apart locating pins 336 adapted to be received within locating holes 326 in body portion 314. Pins 336 are dimensioned to be press-fit within holes 326. Protective insert 312 is preferably formed of a polymer material, as heretofore described. Protective insert 312, being in two pieces, provides easier attachment onto cathode and anode leads 54, 64.

The foregoing description illustrates specific embodiments of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A Li-ion or Li-ion polymer battery, comprised of:
   a battery assembly having:
      a plurality of generally planar cathode sections, each having a flat, metallic cathode current collector tab extending therefrom, and one or more generally planar anode sections each having a flat, metallic anode current collector tab extending therefrom, said cathode sections and one or more anode sections being stacked together, wherein said cathode current collector tabs are aligned and said anode current collector tabs are aligned;
      a cathode tab weldment joining said cathode current collector tabs together and to a cathode battery lead; and
      an anode tab weldment joining said anode current collector tabs together and to an anode battery lead;
   a battery package containing said battery assembly, said battery package having an interior space for receiving said anode tab weldment and said cathode tab weldment, said anode and cathode battery leads extending through said packaging to form external battery leads; and
   a protective insert within said battery package disposed within said space, said insert surrounding said anode and cathode tab weldments and isolating said weldments from said battery package, said insert surrounding said battery leads where said battery leads extend through said package.

2. A Li-ion or Li-ion polymer battery as defined in claim 1, wherein said protective insert is a molded component formed from a polymeric material.

3. A Li-ion or Li-ion polymer battery as defined in claim 2, wherein said protective insert surrounds said battery leads where said battery leads extend through said packaging.

4. A Li-ion or Li-ion polymer battery as defined in claim 3, wherein said battery leads project through said insert.

5. A Li-ion or Li-ion polymer battery as defined in claim 4, wherein said protective insert is a one-piece component.

6. A Li-ion or Li-ion polymer battery as defined in claim 5, wherein said protective insert isolates said tab weldments from each other.

7. A Li-ion or Li-ion polymer battery as defined in claim 4, wherein said protective insert is a two-piece component.

8. A Li-ion or Li-ion polymer battery as defined in claim 4, wherein protective insert isolates said tab weldments from each other.

9. A Li-ion or Li-ion polymer battery as defined in claim 3, wherein said protective insert includes a band dimensioned to extend around the sides of said battery assembly.

10. A Li-ion or Li-ion polymer battery as defined in claim 9, wherein said band is dimensioned to cover the sides of said battery assembly and isolate the sides of said battery assembly from said battery package.

11. A Li-ion or Li-ion polymer battery as defined in claim 1, wherein said protective insert shapes the end of said package.

12. A Li-ion or Li-ion polymer battery as defined in claim 1, wherein said protective insert has a body portion and a flange portion.

13. A Li-ion or Li-ion polymer battery as defined in claim 12, wherein said body portion has two recesses formed therein dimensioned to receive a cathode tab weldment and an anode tab weldment therein.

14. A Li-ion or Li-ion polymer battery as defined in claim 13, wherein said flange portion has two flange sections dimensioned to overlay with each other.

15. A Li-ion or Li-ion polymer battery as defined in claim 14, wherein said flange section is generally flat.

16. A Li-ion or Li-ion polymer battery, comprised of:
   a battery assembly having:
      a plurality of generally planar cathode sections, each having a flat, metallic cathode current collector tab extending therefrom, and one or more generally planar anode sections each having a flat, metallic anode current collector tab extending therefrom, said cathode sections and one or more anode sections being stacked together;
      a cathode tab weldment joining said cathode current collector tabs together and to a cathode battery lead; and
      an anode tab weldment joining said anode current collector tabs together and to an anode battery lead;
   a battery package having an interior space for receiving said battery assembly, said anode tab weldment and said cathode tab weldment with said anode and cathode battery leads extending through said packaging to form external battery leads; and
   a molded insert disposed within said battery package surrounding said anode and cathode tab weldments and isolating said weldments from said battery package.

17. A Li-ion or Li-ion polymer battery as defined in claim 16, wherein said protective insert is a molded component formed from a polymeric material.

18. A Li-ion or Li-ion polymer battery as defined in claim 17, wherein said protective insert surrounds said battery leads where said battery leads extend through said packaging.

19. A Li-ion or Li-ion polymer battery as defined in claim 18, wherein said battery leads project through said insert.

20. A Li-ion or Li-ion polymer battery as defined in claim 19, wherein said protective insert is a one-piece component.

21. A Li-ion or Li-ion polymer battery as defined in claim 20, wherein said protective insert is a two-piece component.

22. A Li-ion or Li-ion polymer battery as defined in claim 17, wherein said protective insert includes a band dimensioned to extend around the sides of said battery assembly.

23. A Li-ion or Li-ion polymer battery as defined in claim 22, wherein said band is dimensioned to cover the sides of said battery assembly and isolate the sides of said battery assembly from said battery package.

24. A Li-ion or Li-ion polymer battery as defined in claim 16, wherein said protective insert has a body portion and a flange portion.

25. A Li-ion or Li-ion polymer battery as defined in claim 24, wherein said body portion has two recesses formed therein dimensioned to receive a cathode tab weldment and an anode tab weldment therein.

26. A Li-ion or Li-ion polymer battery as defined in claim 25, wherein said flange portion has two flange sections dimensioned to overlay with each other.

27. A Li-ion or Li-ion polymer battery as defined in claim 26, further comprising a cover portion for overlaying said flange portion and capturing portions of said cathode and anode battery leads.

* * * * *